(12) United States Patent
Kaiser

(10) Patent No.: US 9,927,524 B2
(45) Date of Patent: Mar. 27, 2018

(54) LIDAR IMAGER

(75) Inventor: Jean-Luc Kaiser, Erpeldange (LU)

(73) Assignee: IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 13/823,454

(22) PCT Filed: Sep. 5, 2011

(86) PCT No.: PCT/EP2011/065267
§ 371 (c)(1),
(2), (4) Date: Mar. 14, 2013

(87) PCT Pub. No.: WO2012/034881
PCT Pub. Date: Mar. 22, 2012

(65) Prior Publication Data
US 2013/0182239 A1   Jul. 18, 2013

(30) Foreign Application Priority Data

Sep. 17, 2010   (LU) ......................................... 91737

(51) Int. Cl.
*G01C 3/08* (2006.01)
*G01S 17/89* (2006.01)
*G01S 7/481* (2006.01)
*G01S 17/88* (2006.01)
*G02B 26/10* (2006.01)

(52) U.S. Cl.
CPC ............. *G01S 17/89* (2013.01); *G01S 7/4811* (2013.01); *G01S 7/4817* (2013.01); *G01S 17/88* (2013.01); *G02B 26/106* (2013.01)

(58) Field of Classification Search
CPC ...... G01S 7/4811; G01S 7/4817; G01S 17/89; G01S 17/42; G01C 3/08; G01C 15/002
USPC ....... 356/3.01, 4.01, 4.07, 5.01, 5.09, 9, 625
See application file for complete search history.

(56) References Cited

U.S. PATENT DOCUMENTS

| 4,235,504 A | 11/1980 | Ikeda et al. |
| 4,923,262 A | 5/1990 | Clay |
| 5,009,502 A * | 4/1991 | Shih et al. .................. 356/152.1 |
| 6,097,491 A * | 8/2000 | Hartrumpf .................... 356/622 |
| 6,229,600 B1 * | 5/2001 | Martynov ...................... 356/123 |
| 6,476,943 B1 * | 11/2002 | Yertoprakhov ........ G01S 7/4811 250/201.9 |
| 6,628,355 B1 * | 9/2003 | Takahara ...................... 349/106 |
| 6,751,338 B1 * | 6/2004 | Wallack ....................... 382/106 |

(Continued)

FOREIGN PATENT DOCUMENTS

| CN | 101776760 A | 7/2010 |
| EP | 044811 A2 | 3/1991 |

OTHER PUBLICATIONS

International Search Report for corresponding application PCT/EP2011/065267 filed Sep. 5, 2011; dated Oct. 11, 2011.

(Continued)

*Primary Examiner* — Samantha K Abraham
(74) *Attorney, Agent, or Firm* — Reising Ethington P.C.

(57) ABSTRACT

A lidar imager for acquiring a range image of a scene comprises a light source for emitting a light beam, a scanning device for scanning the light beam across the scene and a light sensor for receiving light reflected from the scene. The scanning device comprises a spatial light modulator (SLM) configured to display holograms that deflect the light beam into different directions within the scene to be imaged.

21 Claims, 2 Drawing Sheets

(56) References Cited

U.S. PATENT DOCUMENTS

| | | | |
|---|---|---|---|
| 7,218,435 B2* | 5/2007 | Slinger | 359/245 |
| 7,643,149 B2* | 1/2010 | Freimann et al. | 356/458 |
| 2003/0002040 A1* | 1/2003 | MacAulay | G01N 21/253 |
| | | | 356/317 |
| 2006/0043184 A1* | 3/2006 | Fukuchi et al. | 235/454 |
| 2008/0186308 A1* | 8/2008 | Suzuki et al. | 345/419 |
| 2009/0231593 A1* | 9/2009 | Freimann | G01M 11/0221 |
| | | | 356/458 |
| 2010/0231895 A1* | 9/2010 | Mann | G01B 9/021 |
| | | | 356/72 |

OTHER PUBLICATIONS

Written Opinion for corresponding application PCT/EP2011/065267 filed Sep. 5, 2011; dated Oct. 11, 2011.
Chinese Office Action for Chinese Application No. 201180043973.8, Office Action dated Nov. 13, 2014, 7 pages. Translation English.
Chinese Office Action for Chinese Application No. 201180043973.8,Office Action dated Nov. 13, 2014, 7 pages, Non-translated.
Liu; Dynamical Laser Beams Steering with Phase-Only Spatial Light Modulator;Chinese Journal of Lasers, vol. 33, No. 7, Jul. 2006;with English Abstract.
China Office Action for Chinese Application No. 201180043973.8; OA dated Jul. 28, 2015; 10 pages; English Translation.
China Office Action for Chinese Application No. 201180043973.8; OA dated Jul. 28, 2015; 21 pages; non-English Translation.
Long; "The Research of Inertialess Light-beam Scanning Control Technology"; Aug. 15, 2009; 11 pages. See English concise summary of this reference in the Chinese Office Action Translation co-filed with this IDS.

\* cited by examiner

LIDAR IMAGER

TECHNICAL FIELD

The present invention generally relates to range imaging, i.e. creation of a pixel image of a scene wherein each pixel represents the distance from the imager to the corresponding point in the scene. The present invention specifically relates to a scanning lidar imager.

BACKGROUND ART

A known approach to three-dimensional vision uses the "time-of-flight" measurement principle. The range (distance) from the imaging apparatus to a point in the scene is measured by timing of the return of a pulse of light projected onto that point. Lidar systems transmit a modulated light beam into the scene and compare the modulation of the transmitted and returned signal to determine range. For instance, coherent frequency modulator (FM) lidar incorporates frequency modulation/mixing to determine range. However, FM lidar systems suffer from the limited frequency modulation capabilities of current laser diodes. Phase shift (AM) lidar is a preferred approach that correlates the phase shift between outgoing and incoming amplitude modulated light beams to determine range.

Lidar 3D imaging systems can be classified into two categories: Lidar imagers of the first category use refractive or reflective imaging optics to image the scene onto a detector array.

Lidar imagers of the second category obtain a range image of the scene in a time-division-multiplexed manner by scanning a light beam across the scene and determining a range value for each point illuminated by the light beam. To sweep the light beam through the scene to be imaged, one conventionally uses a scanning mirror. Document EP 0 448 111 discloses a lidar scanning system with a rotating multifaceted polygon mirror for transmitting modulated light from one of its facets to a surface to be imaged. Diffuse light reflected off the surface is received by another facet of the polygon mirror and reflected to a photo detector. The modulation phase difference between the transmitted and received light is then used to compute the range of the surface from the scanning system.

Current systems of both categories typically suffer from the disadvantage that they are cannot easily be reconfigured. Once the system has been set up, the field of view is usually fixed and can only be changed by replacing the imaging optics or the mechanical scanning device. Systems with automatic zooming are very complex and thus expensive. Furthermore, such systems typically comprise a high number of moving components, which is undesired for some applications. With scanning lidar imagers, the frame rate is furthermore given by the frequency of the scanning mirror.

BRIEF SUMMARY

The present invention provides a more flexible lidar imager.

A lidar imager for acquiring a range image of a scene comprises a light source (typically a laser) for emitting a light beam, a scanning device for scanning the light beam across the scene and a light sensor for receiving light reflected from the scene. According to the invention, the scanning device comprises a spatial light modulator (SLM) configured to display holograms that deflect the light beam into different directions within the scene to be imaged.

Those skilled will appreciate that a lidar image in accordance with the invention does not require mechanically movable parts, such as rotating or pivoting mirrors to sweep the light beam across the scene. The system may thus be kept mechanically simple. An important advantage of the invention is that the system can easily be tuned or reconfigured by appropriate programming the SLM. For instance, the shape (e.g. the divergence) of the emitted light beam and/or the field of view of the light sensor can be tuned via the SLM. Unlike with mechanical scanners, which repeat always the same scanning pattern, the light beam may be caused to illuminate points in the scene in a random sequence, just by programming the SLM with corresponding sequence of holograms to be displayed. It follows that the frame rate may be flexibly chosen.

Thus, by changing only the holograms displayed by the SLM (and timing of the measurements), one is able to cover a large range of different applications or modes of operation, from ones requiring a very fast frame rate at low resolution, to ones requiring a high resolution at a low frame-rate. It is possible to combine different modes of operation, by defining, e.g., areas of interest in the scene where a high resolution at a high frame rate is required, while for the rest of the scene only rough measurements are sufficient, at low frame rates and/or low resolution. The system could also be configured switch, on demand or upon occurrence of a triggering event, from a "standby" mode with low frame rate and/or low resolution, to a full-operation mode with high frame rate and/or high resolution.

As will be appreciated, the SLM can be a reflective or a transmissive SLM. The SLM may e.g. comprise a (transmissive) ferroelectric liquid crystal (FLC) panel or a (reflective) FLC on silicon (FLCoS). Commercially available FLCoS panels have up to 1280×1024 pixels (reconfigurable elements). Their response time of is less than 100 µs (which makes it possible to image a scene with 100×100 pixels at a frame rate of 1 Hz, or with 10×10 pixels at a frame rate of 100 Hz). In research papers, FLC cells with response times <10 µs are presented. Alternatively the spatial light modulator could comprise a digital micromirror device, i.e. a chip having on its surface a rectangular array of several hundred thousand pivotable microscopic mirrors. Other technologies could be used for the SLM, such as e.g. a dynamically adjustable diffraction grating (available e.g. as "grating light valve").

According to a preferred embodiment of the invention, the light sensor and the SLM are arranged one with respect to the other such that the light sensor receives the reflected light via the SLM. The SLM may e.g. comprise a first area to display the holograms deflecting the light beam and a separate, second area to display further holograms deflecting and/or focusing the reflected light on the light sensor. Alternatively, the SLM may comprise a common area for the emitted light beam and the reflected light, in which the holograms deflecting the light beam also deflect and/or focus the reflected light on the light sensor. If the emitted light beam and the reflected light are superposed in the SLM, the lidar imager preferably comprises a beam splitter to separate the reflected light from the emitted light beam.

According to another preferred embodiment of the invention, a separate spatial light modulator is provided to display holograms deflecting and/or focusing the reflected light on the light sensor.

An advantage with respect to mechanically scanning systems is that the SLM may be used to guarantee that the illuminated spot is always correctly imaged onto the light detector. For a mechanically scanning system this alignment can only be achieved by physically moving the different components (lenses, mirrors, light source, detector) one with respect to the others.

Preferably, the lidar imager comprises optical elements arranged with the spatial light modulator in such a way as to increase deflection of the light beam.

Advantageously, the spatial light modulator may be configured to modulate the phase but not the amplitude of the light beam.

Preferably, the lidar imager comprises one or more optical filters to suppress undesired diffraction orders produced by the SLM.

BRIEF DESCRIPTION OF THE DRAWINGS

Preferred embodiments of the invention will now be described, by way of example, with reference to the accompanying drawings in which.

In the drawings, same or similar elements are designated by the same reference numbers; when appropriate to avoid confusion between the different examples, a prefix in accordance with the number of the drawing is used.

DESCRIPTION OF PREFERRED EMBODIMENTS

Figure 1:
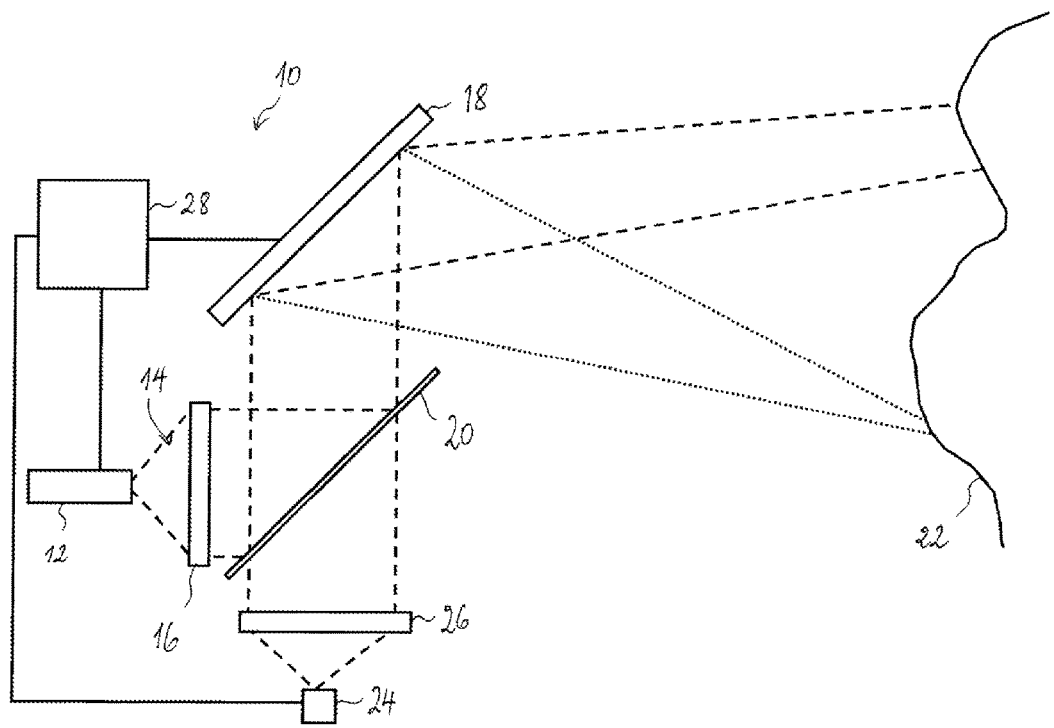
FIG. 1 is a schematic layout of a lidar imager according to a first embodiment of the invention.

A first example of a lidar imager 10 according to the invention is shown in FIG. 1. The lidar imager comprises a light source 12 (e.g. a laser), which emits a light beam 14 with sufficient coherence length. The light beam 14 is shaped (collimated) by optics 16 (one or more lenses and/or mirrors). The emitted light beam 14 is incident on a reflective SLM 18 after passing through a beam splitter 20, which separates the emission and reception light paths. In operation, the SLM displays a sequence of holograms that shape the light beam 14 and redirect it into different parts of the scene 22. When the light beam hits an obstacle in the scene, a part of the light is reflected to the lidar image on the light path in opposite direction. The reflected light is deflected by the SLM 18 and focused on a photodetector 24 by optics 26 after passing through the beam splitter 20.

A control unit 28 (e.g. a microprocessor, an application-specific integrated circuit, a field-programmable gate array, or the like) controls operation of the light source 12, the SLM 18 and the photodetector 24. The control unit 28 calculates the distance between the lidar imager 10 and the currently illuminated spot in the scene based on the time of flight of the emitted light. The control unit 28 also determines the sequence of holograms displayed by the SLM 18 and thus controls which spot or region of the scene 22 is illuminated at what time. FIG. 1 shows an emission and reception light path for another hologram displayed by the SLM 18 with dotted lines.

Figure 2:
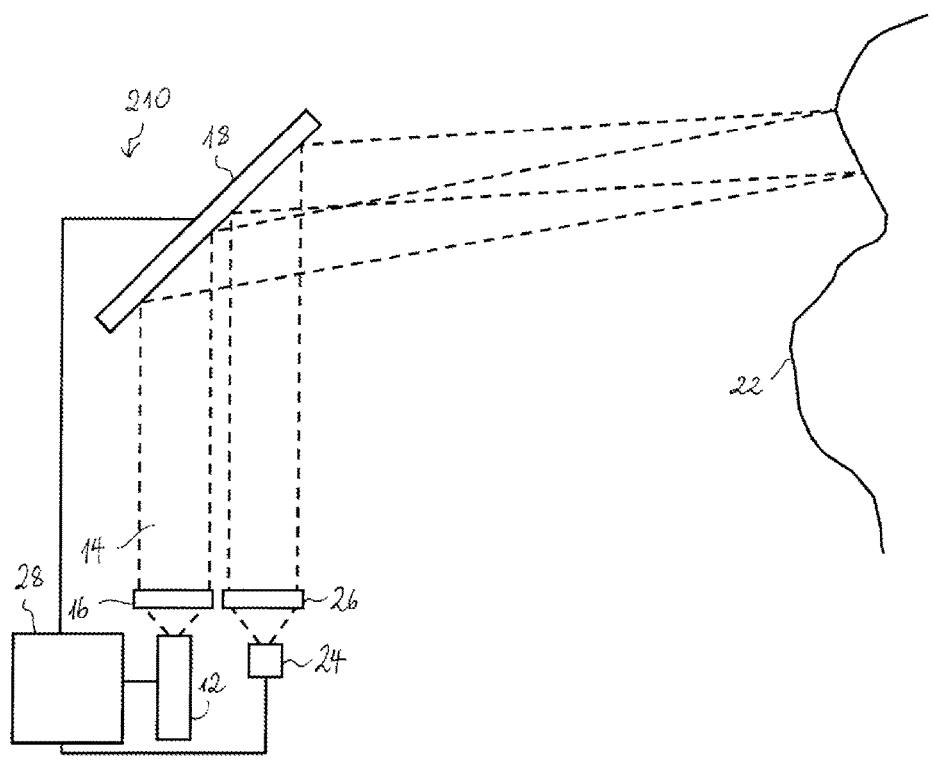
FIG. 2 is a schematic layout of a lidar imager according to a second embodiment of the invention.

FIG. 2 shows a second example of a lidar imager 210. This example differs from the example of FIG. 1 in that it uses separate optical paths for emission and reception. A beam splitter is thus not necessary in this example. The lidar imager 210 comprises a single SLM 18 with separate areas to deflect the emitted and the reflected light. As an alternative, the lidar imager 210 could be equipped with separate SLMs for emission and reception. In all other respects, the lidar imager 210 corresponds to the lidar imager of FIG. 1 and operates in the same way.

Figure 3:
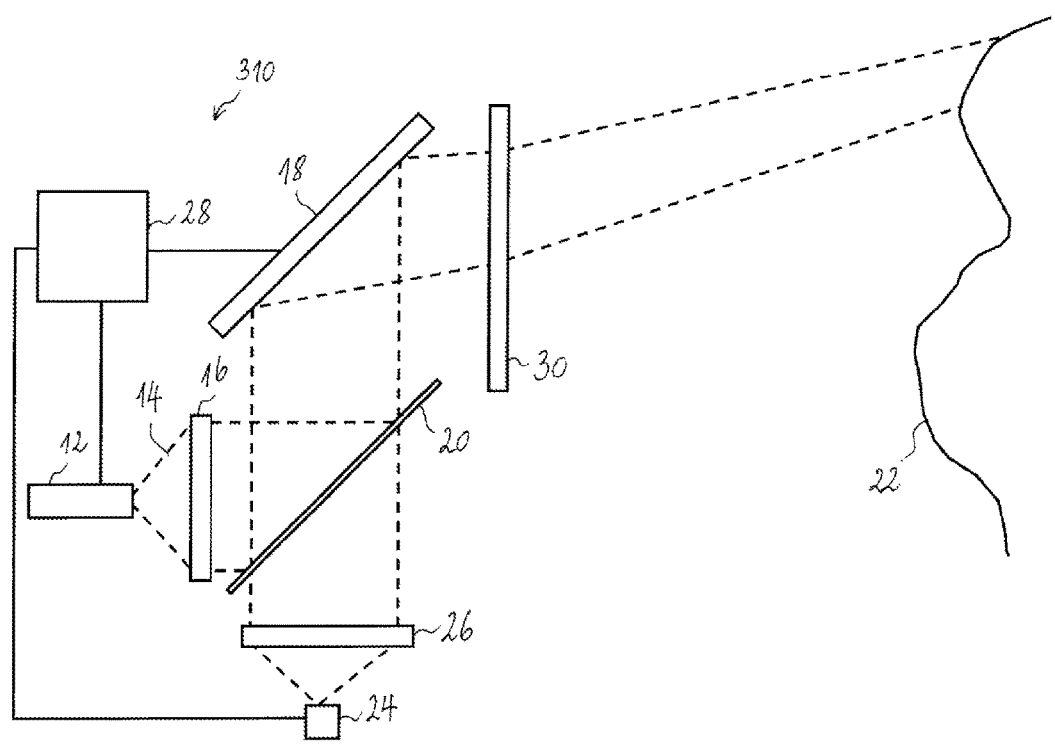
FIG. 3 is a schematic layout of a variant of the lidar imager of FIG. 1.

FIG. 3 illustrates a variant of the lidar imager of FIG. 1. The lidar imager 310 includes magnifying and/or filtering optics 30 (one or more lenses and/or mirrors) for increasing the deflection of the light beams and/or suppressing undesired diffraction orders. In all other respects, the lidar imager 310 corresponds to the lidar imager of FIG. 1 and operates in the same way.

The invention claimed is:

1. A lidar imager for acquiring a range image of a scene comprising
   a light source configured for emitting a light beam;
   a scanning device comprising a spatial light modulator configured to display a sequence of holograms that shape the light beam and redirect it sequentially on to different parts of the scene;
   a light sensor configured for receiving light reflected from said scene; and
   a control unit configured to control a frame rate and the sequence of holograms displayed by said spatial light modulator, thereby controlling the parts of the scene to be sequentially illuminated,
   wherein the lidar imager is structured to create a pixel image of the scene wherein each pixel of the image represents distance from the lidar imager to a corresponding point in the scene.

2. The lidar imager as claimed in claim 1, wherein said spatial light modulator is a reflective spatial light modulator.

3. The lidar imager as claimed in claim 1, wherein said spatial light modulator is a transmissive spatial light modulator.

4. The lidar imager as claimed in claim 1, wherein said spatial light modulator comprises a ferroelectric liquid crystal panel.

5. The lidar imager as claimed in claim 1, wherein said spatial light modulator comprises a digital micromirror device.

6. The lidar imager as claimed in claim 1, wherein said light sensor and said spatial light modulator are arranged one with respect to the other such that said light sensor receives said reflected light via said spatial light modulator.

7. The lidar imager as claimed in claim 6, wherein said spatial light modulator comprises a first area to display said holograms deflecting said light beam and a separate, second area to display further holograms deflecting and/or focussing said reflected light on said light sensor.

8. The lidar imager as claimed in claim 6, wherein said spatial light modulator comprises a common area for said emitted light beam and said reflected light, in which said holograms deflecting said light beam also deflect and/or focus said reflected light on said light sensor.

9. The lidar imager as claimed in claim 8, comprising a beam splitter to separate said reflected light from said emitted light beam.

10. The lidar imager as claimed in claim 1, comprising a further spatial light modulator to display further holograms deflecting and/or focussing said reflected light on said light sensor.

11. The lidar imager as claimed in claim 1, comprising one or more optical elements arranged with said spatial light modulator in such a way as to increase deflection of said light beam.

12. The lidar imager as claimed in claim 1, wherein said spatial light modulator is configured to modulate the phase but not the amplitude of said light beam.

13. The lidar imager as claimed in claim 1, comprising one or more optical filters to suppress undesired diffraction orders produced by said spatial light modulator.

14. The lidar imager as claimed in claim 1, wherein the control unit is configured to calculate the distance between the lidar imager and a currently illuminated spot in the scene based on the time of flight of the emitted light beam.

15. The lidar imager as claimed in claim 1, wherein the pixel image comprises at least one 10×10 pixel image.

16. A lidar imager for acquiring a range image of a scene comprising
a light source configured for emission of a light beam;
a scanning device configured for scanning said light beam across said scene, wherein said scanning device comprises at least one of a reflective spatial light modulator and a transmissive spatial light modulator, said at least one of a reflective spatial light modulator and a transmissive spatial light modulator being configured to display a sequence of holograms deflecting said light beam on the different parts of the scene;
a light sensor configured for reception of light reflected from said scene; and
a control unit configured to control a frame rate and the sequence of holograms displayed by said scanning device, thereby controlling the parts of the scene to be sequentially illuminated,
wherein the lidar imager is structured to create a pixel image of the scene wherein each pixel of the image represents distance from the lidar imager to a corresponding point in the scene.

17. The lidar imager as claimed in claim 16, comprising a beam splitter to separate said reflected light from said emitted light beam.

18. The lidar imager as claimed in claim 16, comprising a further spatial light modulator to display further holograms deflecting and/or focussing said reflected light on said light sensor.

19. The lidar imager as claimed in claim 16, comprising one or more optical elements arranged with said at least one of a reflective spatial light modulator and a transmissive spatial light modulator in such a way as to increase deflection of said light beam.

20. The lidar imager as claimed in claim 16, wherein said at least one of a reflective spatial light modulator and a transmissive spatial light modulator is configured to modulate a phase but not an amplitude of said light beam.

21. The lidar imager as claimed in claim 16, comprising one or more optical filters to suppress undesired diffraction orders produced by said at least one of a reflective spatial light modulator and a transmissive spatial light modulator.

* * * * *